May 14, 1929.  C. J. W. CLASEN  1,712,748
RAILWAY CAR TRUCK
Filed Feb. 25, 1928

INVENTOR
C. J. W. Clasen
BY
Evans + McCoy
ATTORNEYS

Patented May 14, 1929.

1,712,748

UNITED STATES PATENT OFFICE.

CLAUS J. WERNER CLASEN, OF DAVENPORT, IOWA, ASSIGNOR TO THE BETTENDORF COMPANY, OF BETTENDORF, IOWA, A CORPORATION OF IOWA.

RAILWAY-CAR TRUCK.

Application filed February 25, 1928. Serial No. 256,944.

This invention relates to railway car trucks and has for its object to provide a truck of simple, rugged and relatively inexpensive construction in which rail friction and tread wear are reduced to a minimum by mounting the supporting wheels for free rotation on their axles.

A further object of the invention is to utilize the truck axles not only for mounting the supporting wheels, but also as frame members providing rigid connections between the side frame members.

A further object is to provide a truck in which each wheel is rotatably mounted on its axle and is securely held against lateral movement on the axle.

A further object is to provide a construction of the character above described in which the wheels, axles and other parts of the truck are readily removable for replacement or repair.

A further object is to provide a construction which permits the use of independent seats for bolster springs at opposite sides of the truck frame making it unnecessary to provide a rigid cross member such as a spring plank between central portions of the side frame members.

A further object of the invention is to provide a truck of the character above described in which longitudinal frame members are provided adjacent the inner and outer sides of the wheels at each side of the truck, in which the frame members are rigidly attached at their ends to the axles and in which provision is made for suspending the brakes between the front and rear wheels.

With the above and other objects in view, the invention may be said to comprise the truck as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Figure 1:
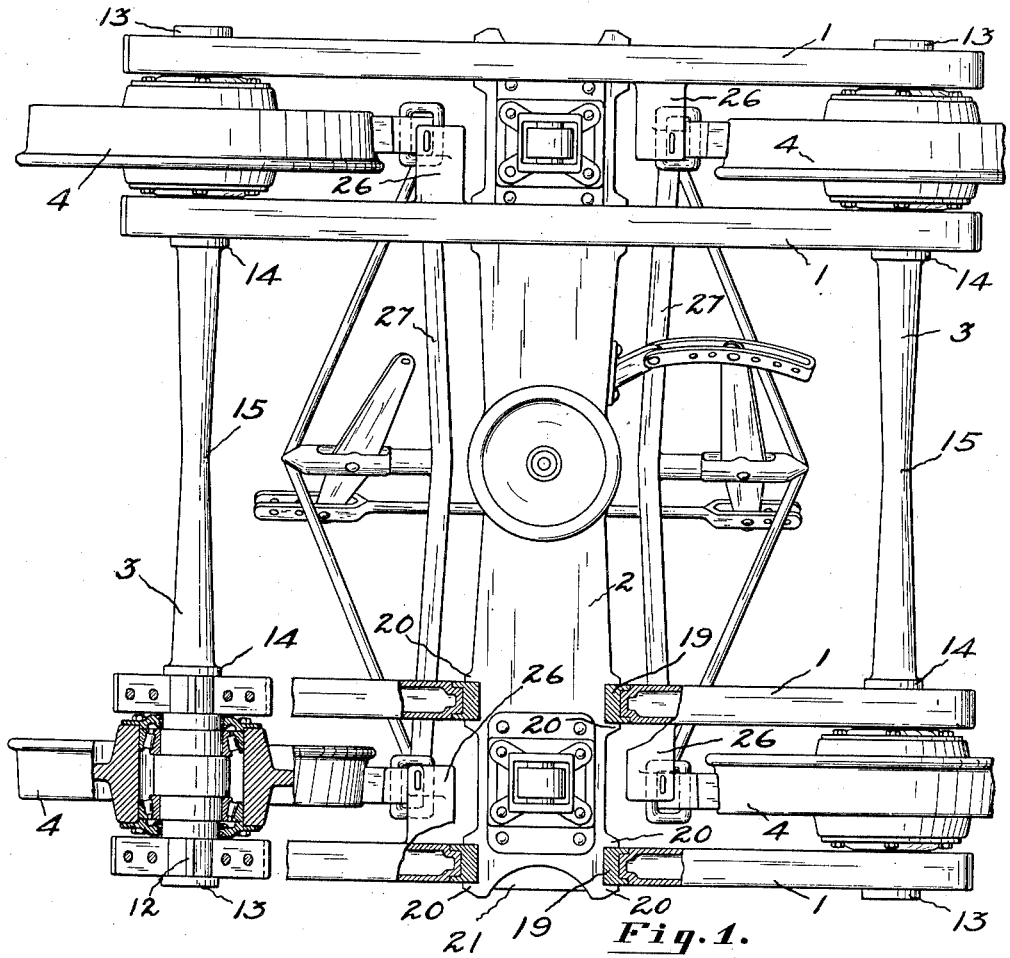
Figure 1 is a plan view partially broken away to show the bolster guides.
Figure 2:
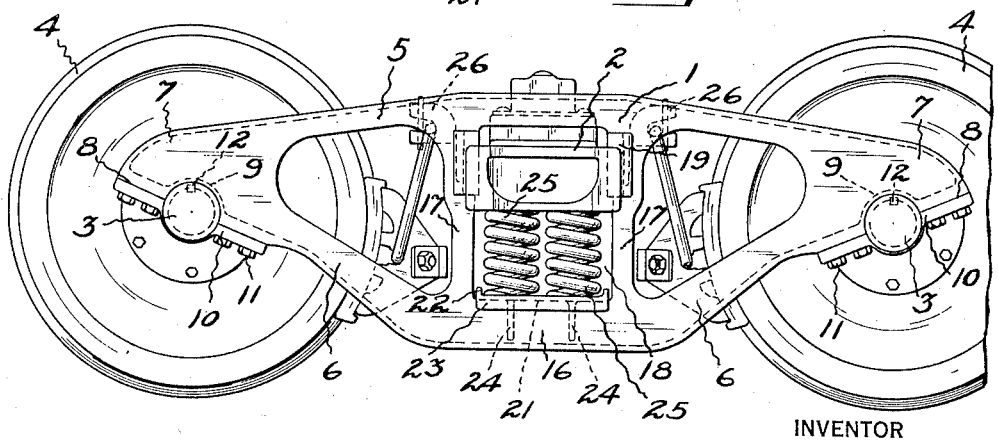
Fig. 2 is a side elevation of the truck.

As shown in the accompanying drawings, the truck is provided with longitudinal frame members 1 arranged in pairs at opposite sides of the truck and also with a bolster 2 extending transversely between the central portions of the frame members. The ends of the frame members are connected by transverse axles 3 which carry the supporting wheels 4, which are positioned between the frame members of each pair at opposite sides of the truck, the wheels 4 being rotatably mounted on the end portions of the axle on roller bearings such as disclosed in my copending application Serial No. 256,946, filed Feb. 25, 1928.

Each frame member is of truss form and has a compression chord 5 and a tension chord 6 which merge into end portions 7. The end portions 7 have inclined bottom faces 8 in which are formed half bearings 9 which fit upon the axle and, detachably secured to the inclined faces 8, are complemental half bearings 10 which serve to clamp the axle in place, the half bearings 10 being secured to the frame members by means of bolts 11. The axles 3 are secured against rotation in the frame members by means of keys 12 which are carried by the axles and fit in recesses or grooves in the half bearings 9. The axles are provided at their ends with shoulders 13 which engage the outer faces of the outer side frame members and inwardly of the inner frame members are provided with shoulders 14 which engage the inner frame members so that the axles are rigidly held against endwise movement in the frame members. The wheels are mounted for independent rotation on the axles and since the wheels are mounted between pairs of adjacent side frames, the only portions of the axles subjected to bending forces due to vertical load are those between the adjacent side frames, and consequently the intermediate portions 15 of the axles may be reduced in diameter. The ends of the tension chord 6 of each of the frame members are inclined downwardly from the end portions 7 to a central horizontal supporting portion 16 and the tension and compression chords are connected adjacent the ends of the portion 16 of the tension chord by vertical integral columns 17 which are spaced apart a sufficient distance to provide a bolster opening 18. Bolster guide shoes 19 are attached to the upper portions of the columns 17 and the bolster 2 is provided at its opposite ends with laterally projecting ribs 20 which engage the inner and outer sides of the guide shoes 19. The rigid connection between the frame members at opposite sides of the truck provided by the axles 3 makes it unnecessary to provide additional connections between the frame members and for that reason, the usual spring plank extending across the truck beneath the bolster is preferably omitted. The spring plank is replaced by individual spring seats which bridge the space between the horizontal portions 16 of the tension chords of the frame members at each side of the truck. The spring seats 21 are of channel form having vertical side flanges 22 and downturned end flanges 23 which engage the outer faces of the supporting portions 16. The spring seats are additionally braced by integral ribs 24 on the bottom thereof which terminate short of the ends of the seat a distance sufficient to permit the supporting portions 16 of the tension chords to be received between the flanges 23 and the ends of the ribs 24. A suitable number of supporting springs 25 are mounted upon each of the seats 21 and bear the weight of the bolster. The four longitudinal frame members are preferably of identical construction and interchangeable. Each of the frame members is provided adjacent one side of the bolster opening with a laterally projecting integral bracket 26 and in assembling the frame members, the frame members are so arranged that the brackets 26 on the frame members of each pair lie upon opposite sides of the bolster and project each toward the opposite frame members of the pair.

The brackets 26 on the outer frame member of one pair and the inner frame member of the other pair may lie, as shown in Fig. 1, upon the same side of the bolster, and provide a support for a brake beam 27 of standard form, or if desired, both brackets may be carried by one side frame.

It is also obvious that the keys 12 may be mounted in the keyways with a slight clearance to permit a partial rotation of the axles to allow one corner of the truck to negotiate uneven joints in the track without creating excessive torsional stresses in the axle. It is to be noted, however, that such keys will limit rotation of the axles and the axles provide rigid cross connections between the frame members.

It will be apparent that the present invention provides a truck in which tread wear and rail friction is reduced to a minimum by reason of the fact that the wheels rotate freely on the axles, that the removal of wheels, bearings and other parts for replacement or repair is made easy and that considerable saving on cost of manufacture is effected by reason of the reduction of weight and simplicity of design.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A railway car truck having front and rear axles, supporting wheels rotatably mounted on the axles, four longitudinal frame members arranged in pairs on opposite sides of the truck, said frame members being secured to said axles and held against movement longitudinally of the axles, the frame members of each pair lying on opposite sides of front and rear supporting wheels at one side of the truck, a brake beam bearing bracket carried by each frame member, and brake beams suspended from said bearing brackets.

2. A railway car truck having front and rear axles, supporting wheels rotatably mounted on the axles, four longitudinal frame members arranged in pairs on opposite sides of the truck, said frame members being secured to said axles and held against movement longitudinally of the axles, a bolster yieldably supported by the frame members and held against longitudinal movement whereby horizontal thrusts from the bolster are transmitted to the four frame members, a brake beam bearing bracket carried by each frame member between an axle and the bolster and brake beams suspended from said bearing brackets.

3. A railway car truck having front and rear axles, supporting wheels rotatably mounted on the axles, four longitudinal frame members arranged in pairs at opposite sides of the truck and secured to the axles, the frame members of each pair lying on opposite sides of the front and rear supporting wheels at one side of the truck, a brake beam suspended from two of the frame members, and a second brake beam suspended from the other two frame members, said brake beams being suspended from bearing brackets carried by the side frames between the wheels and the bolster.

4. A railway car truck having front and rear axles, supporting wheels rotatably mounted on the axles, four longitudinal frame members arranged in pairs at opposite sides of the truck and secured to the axles, the frame members of each pair lying on opposite sides of the front and rear supporting wheels at one side of the truck, a brake beam suspended from the outer of the frame members of one pair and the inner of frame members of the other pair, and a second brake beam suspended from the other two frame members, said brake beams being suspended from bearing brackets carried by the side frames between the wheels and the bolster.

5. A railway car truck having front and rear axles, supporting wheels rotatably mounted on the axles, four identical longitudinal frame members, arranged in pairs on opposite sides of the truck and secured to the axles, the frame members of each pair lying on opposite sides of the front and rear supporting wheels at one side of the truck, and each of said frame members having a laterally projecting brake beam supporting bracket.

6. A railway car truck having front and rear axles, supporting wheels rotatably mounted on the axles, four identical longitudinal frame members, arranged in pairs on opposite sides of the truck and rigidly secured to the axles, the frame members of each pair lying on opposite sides of the front and rear supporting wheels at one side of the truck, and each of said frame members having a centrally located bolster opening and a laterally extending brake beam supporting bracket adjacent one side of the bolster opening.

7. A railway car truck having front and rear axles, supporting wheels rotatably mounted on the axles, four identical longitudinal frame members, arranged in pairs on opposite sides of the truck and rigidly secured to the axles, the frame members of each pair lying on opposite sides of the front and rear supporting wheels at one side of the truck, and each of said frame members having a centrally located bolster opening and a laterally extending brake beam supporting bracket adjacent one side of the bolster opening, the frame members of each pair being reversely positioned so that the brackets thereof lie between the frame members and on opposite sides of the bolster windows.

8. A railway car truck having front and rear axles, a pair of longitudinal frame members at each side of the truck, each frame member being rigidly secured at its opposite ends to said axles, wheels independently rotatable on the axles and mounted between the frame members of each pair, bolster supporting means carried by the frame members centrally thereof, and brake beam supporting members carried by the frame members forwardly and rearwardly of the bolster supporting means and adjacent thereto, one brake beam supporting member being carried by each of the said frame members.

In testimony whereof I affix my signature.

CLAUS J. WERNER CLASEN.